United States Patent [19]

Lee

[11] Patent Number: 5,184,534
[45] Date of Patent: Feb. 9, 1993

[54] OPERATION SAFETY DEVICE FOR A PORTABLE POWER TOOL

[75] Inventor: Sang H. Lee, Suweon, Rep. of Korea

[73] Assignee: Samsung Electronics Co., Ltd., Kyungki, Japan

[21] Appl. No.: 792,380

[22] Filed: Nov. 15, 1991

[30] Foreign Application Priority Data

Nov. 16, 1990 [KR] Rep. of Korea .................... 90-18586
Nov. 16, 1990 [KR] Rep. of Korea .................... 90-18588

[51] Int. Cl.⁵ .......................................... B27G 19/02
[52] U.S. Cl. ........................................ 83/397; 83/478; 83/490; 83/DIG. 1; 30/391
[58] Field of Search ............ 83/397, 478, 490, DIG. 1; 30/391

[56] References Cited

U.S. PATENT DOCUMENTS 3,922,785  12/1975  Fushiya ............................ 83/478 X
4,033,218   7/1977  Donatelle ....................... 83/DIG. 1

FOREIGN PATENT DOCUMENTS 62-128802  8/1987  Japan .
 0631535   8/1982  Switzerland ....................... 83/478

Primary Examiner—Douglas D. Watts
Assistant Examiner—Raymond D. Woods
Attorney, Agent, or Firm—Burns, Doane, Swecker & Mathis

[57] ABSTRACT

A power miter box includes a power driven blade which is lowered onto a workpiece. A main switch must be actuated manually by an operator to drive the blade. A separate safety switch operates to prevent the blade from being driven until it has been lowered onto the workpiece. The safety switch is operated by relative movement occurring between two guard members which encompass the blade.

6 Claims, 3 Drawing Sheets

OPERATION SAFETY DEVICE FOR A PORTABLE POWER TOOL

FIELD OF THE INVENTION

The present invention relates to a power miter box, and more particularly to an operation safety device for reducing the possibility for accidents to occur.

BACKGROUND OF THE INVENTION

FIG. 5 illustrates a conventional power miter box with a base 1 and a fence 2 which is mounted on the base 1 for supporting against a workpiece 7. A module member 4 supports a circular blade 5 connected to a hinge 3 which extends from a rear portion of the base 1. An arm member 8, containing a main switch 6, manipulates the blade 5 toward and away from the workpiece 7. An upper guard 10 shields an upper portion of the blade 5 and is mounted on the module member 4. A lower safety guard 11 is connected to a rear portion of the upper guard 10 by a pin 9 and slidingly moves in the inside of the upper guard 10 and shields each side surface of the blade 5.

The blade 5 rotates when the main switch 6 of the arm member 8 is electrically operated by a grasp of a worker's hand. With the activation of the blade 5 the arm member 8 is vertically pivoted downward to make the cut and the bottom edge of the lower safety guard 11 contacts with the upper surface of the workpiece 7 and the lower safety guard 11 moves vertically upward, pivoting around the pin 9 as the arm member 8 is continually operated downward. Thus the blade cuts into the workpiece 7.

However, as the blade is being initially lowered, there exists a possibility of an accident occurring as the blade begins to rotate at high speed while approaching the workpiece. To prevent certain accidents, the above-discussed typical safety device in the power miter box is provided as described in Japanese Utility Model Laid-Open No. 62-128802. However, this safety device focuses on eliminating accessibility to the rotating blade by worker; there is no control of the activation of the operation of the blade which is potentially dangerous, as noted above.

SUMMARY OF THE INVENTION

The object of the present invention is to provide a safety device in a power miter box which eliminates the possibility of certain accidents.

An other object of the present invention is to provide a safety device in a power miter box which activate a circular blade only when a lower guard contacts on a workpiece even if the main switch is in the "on" position.

According to the present invention, the operation safety device comprises a passive member which is in close vicinity to a rotation portion of a lower guard and acts concurrently with movement of the lower guard. A secondary switch member is mounted at an upper guard and acts concurrently with movement of the passive member.

The passive member is also provided with a protrusive member moving in a circular arc which corresponds to movement of the lower guard. Otherwise, the passive member is provided with a protrusive member performing a first electrical contact which moves vertically in some extent and moves in a circular arc with which a movement of the lower guard is corresponded.

Further, the secondary switch is provided with a push switch to which the protrusive member is contacted, and performing an electrical contact itself along a circular arc movement of the protrusive member. Otherwise, the secondary switch is provided with a second electrical contact to which the protrusive member is contacted, and performing a sliding movement thereagainst along a circular arc movement of the protrusive member.

Thus, the blade is inactivated although the main power switch is turned on. The lower guard contacts workpiece to be cut and moves upward in rotation. Therefore, the protrusive member is contacted to the push switch or the secondary switch, and the blade is activated.

Accordingly, the secondary switch is provided on the upper guard of a miter box and the protrusive member is provided on the lower guard which is moved upward-downward along the stroke of the blade. During the substantial operation of the blade the power is given to the operation safety device of the miter box. Therefore, this operation safety device eliminates a possibility of the safety accidents owing to a malfunction of a main power switch and increases an efficiency of operation in respect to a sequence production. Furthermore, the safety device can serve as a main power switch when a separate main power switch is deleted.

BRIEF DESCRIPTION OF THE DRAWING

The present invention will be further described with reference to the Drawing, in which.

DETAILED DESCRIPTION

Figure 1:
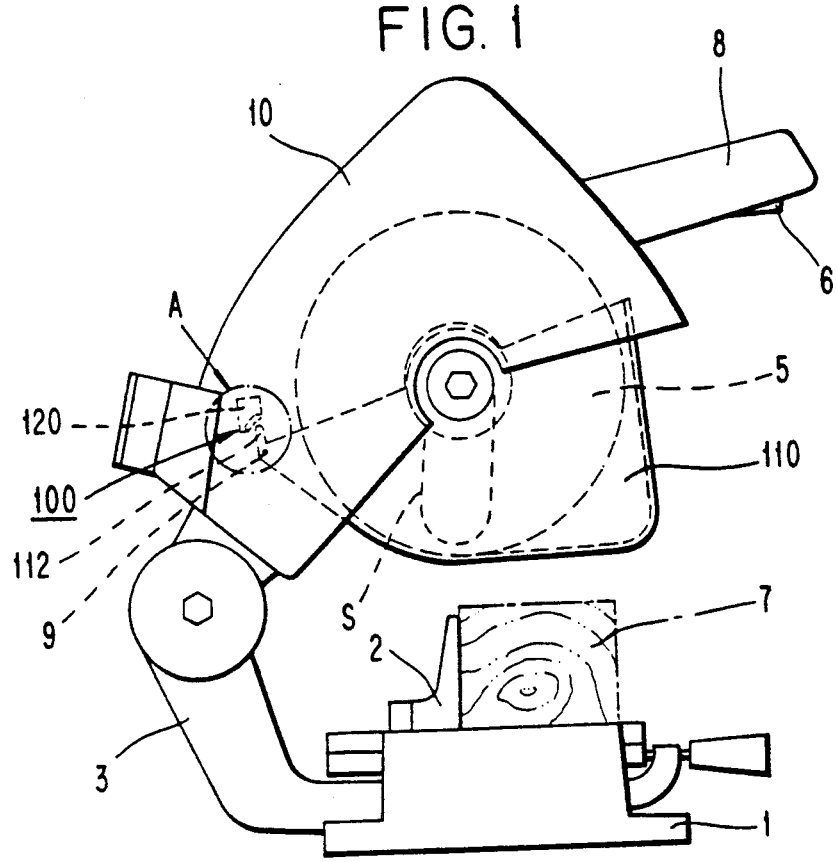
FIG. 1 is a side elevational view of the power miter box according to one embodiment of the present invention.

Preferred embodiments of the present invention will now be described with reference to the Drawing, wherein like reference numerals present like parts and assemblies throughout embodiments described as below, and the like numerals as one of prior art will be omitted.

Figure 2:
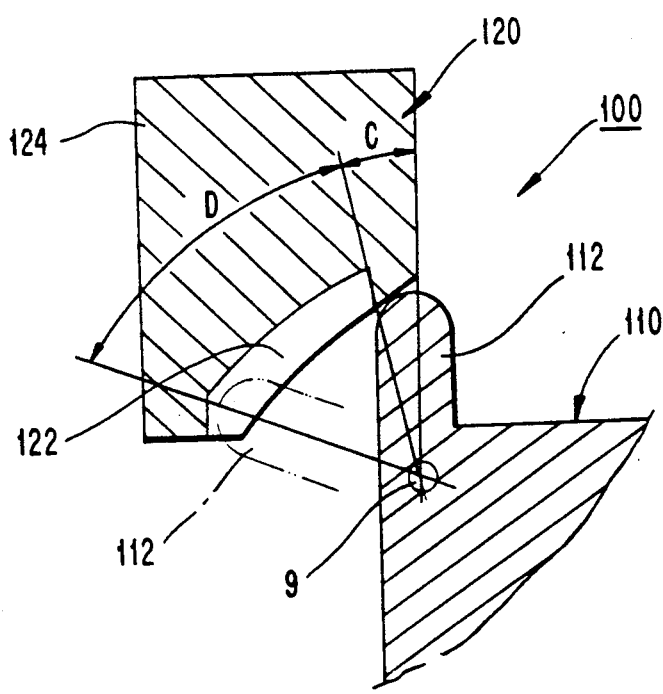
FIG. 2 is an enlarged side view of "A" portion in FIG. 1.

FIG. 1 illustrates a side elevational view of the power miter box having a first embodiment of an operation safety device of the present invention. An operating safety device 100 comprises a protrusive member 112 formed at a rear portion of the lower safety guard 110. A push switch member 120 is contacted by the protrusive member 112 of the lower safety guard 110 during use. Referring to FIG. 2, the protrusive member 112 is integrally formed with the lower safety guard 110 which freely pivots around a pin 9 placed at the rear portion of the lower safety guard. The push switch member 120 is connected by a bolt etc. to the interior surface of the upper guard 10 to contact the tip of the protrusive member 112. The push button 120 comprises a body 124 providing an electrical contact circuit therein, a button 122 having a surface along which the tip of the protrusive member 112 moves. The surface of the button 122 has a longitudinal depression so as to prevent the protrusive member 112 from slipping. The push switch member 120 is charged with the electricity (i.e., a circuit is closed) when the button 122 contacts the protrusive member 112. That is, the push button 120 is electrically connected by the contact of the protrusive member 112 with the button 122 regardless of the extent to which the button 122 is pushed-in by the member 112.

In the above structure, although the worker grips the main switch 6 of the arm member 8, the circular blade 5 is not activated. Upon downward movement of the arm member 8, a bottom edge of the lower guard 110 contacts an upper surface of the workpiece 7. The lower guard 110 is rotated in a counterclockwise direction centering around the pin 9, as permitted by the presence of a slot S formed in a side wall of the lower guard 110, as described for example in the afore-mentioned Japanese Utility Model Laid-Open No. 62-128802. That is, the lower guard 110 is moved upward. Thus, the protrusive member 112 of the lower guard 110 is also rotated in a counterclockwise direction centering around the pin 9. However, in the inactive rotation range "C" of the protrusive member 112, the blade 5 is not activated although the main switch 6 is electrically connected. In this case, the beginning range in which the lower guard 110 contacts the workpiece 7 but the protrusive member 112 does not contact the button 122 is labeled "C". As the arm member 8 continues to move downward, the lower guard 110 continues to move upward. When the button 122 of the push switch member 120 is contacted and pushed by the tip of the protrusive member 112, that is, when the tip of the protrusive member 112 is placed in the active rotation range "D", the push switch member 120 is electrically operated and the blade 5 is activated. Hence, the blade 5 is continuously rotated while the protrusive member 112 pushes the button 122 of the push switch member 120. After the predetermined cutting operation, the arm member 8, having the main switch 6 gripped, is raised a certain extent in order that the cut workpiece can be replaced with a new workpiece. The lower guard 110 is moved downward or rotated in a clockwise direction, and the protrusive member 112 also is rotated in a clockwise direction. That is, the tip of the protrusive member 112 moves from the "D" range to the "C" range. In this case, the contact area of the protrusive member 112 to the button 122 is labeled "D". Therefore, the button 122 returns to the former position, the power circuit for activating the operation blade 5 is broken and the blade 5 cannot rotate.

Figure 3:
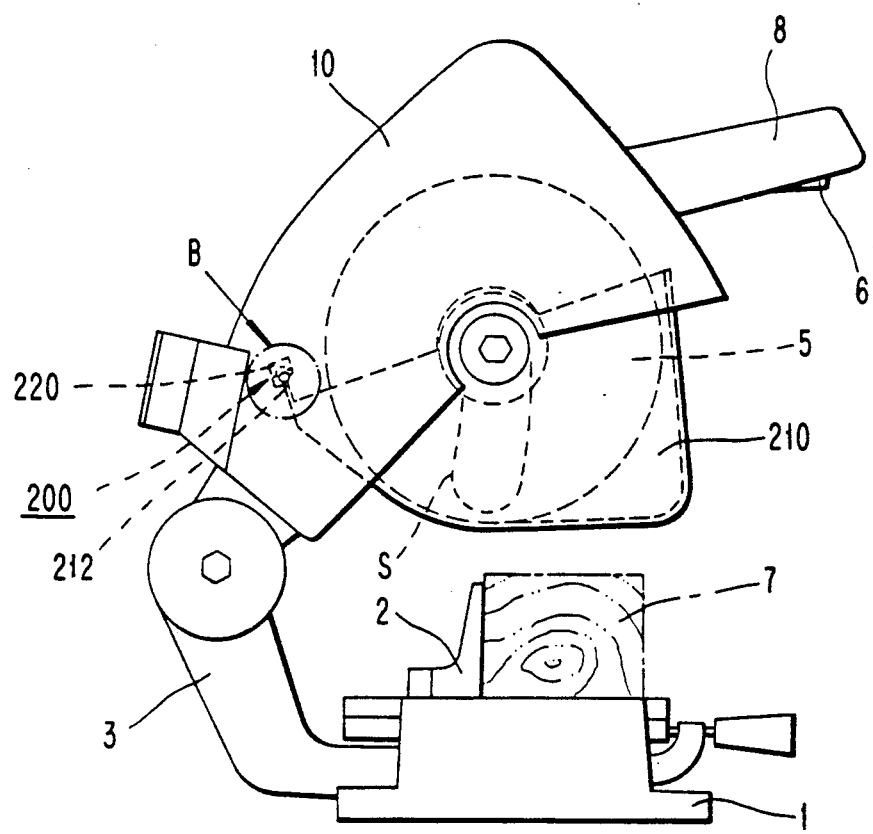
FIG. 3 is a side elevational view of the power miter box according to the other embodiment of the present invention.

FIG. 3 illustrates a side elevational view of a power miter box having a second embodiment of an operation safety device of the present invention. The operating safety device 200 comprises a protrusive member 212, formed at a rear portion of a lower safety guard 210 and a secondary switch member 220 to be contacted with the protrusive member 212 of the lower safety guard 210.

Figure 4:
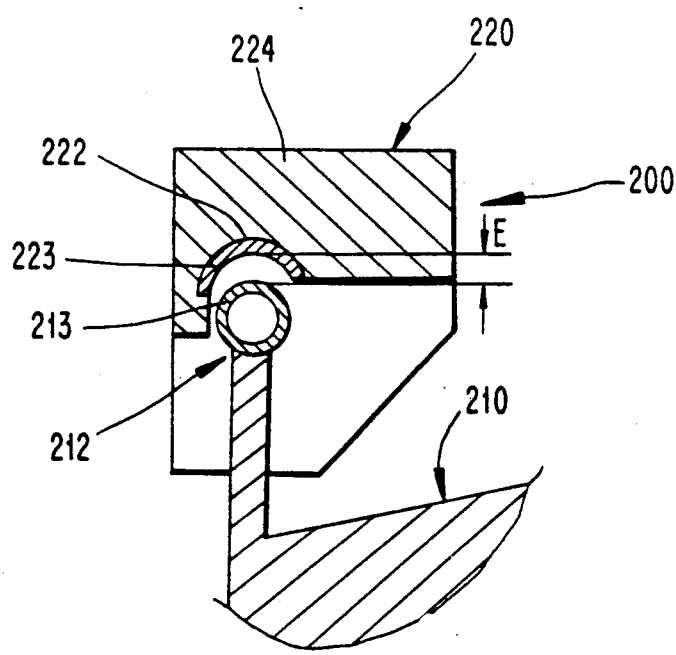
FIG. 4 is an enlarged side view of "B" portion in FIG. 3.
Figure 5:
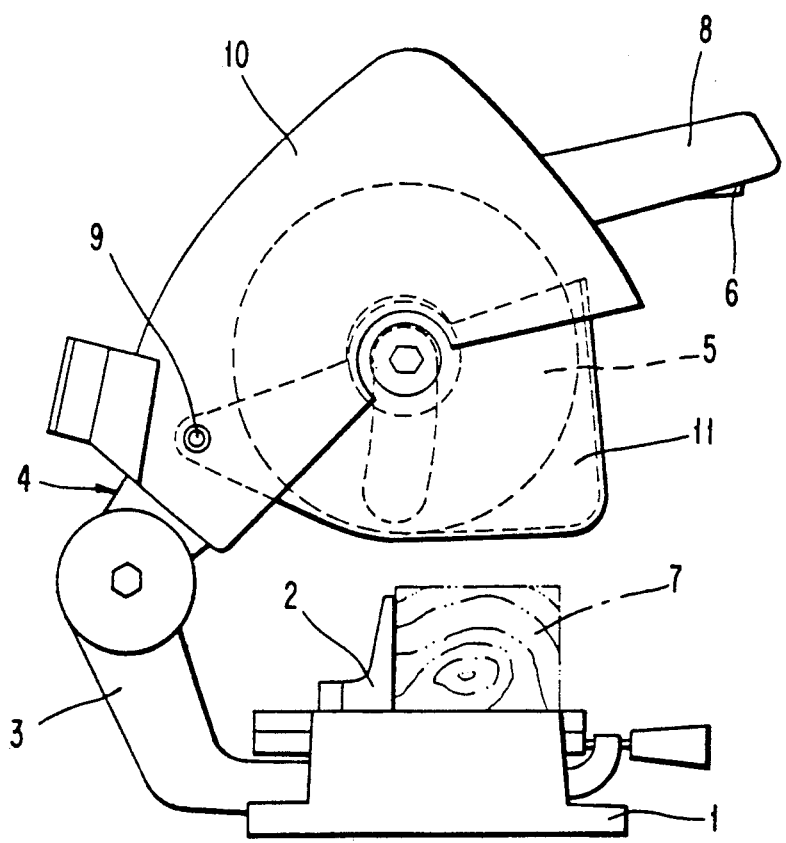
FIG. 5 is a side elevational view of the prior art.

Referring to FIG. 4, the protrusive member 212 is integrally formed with the lower safety guard 210 at the rear upper edge thereof. A front end portion 213 of the protrusive member 212 is formed as a ring and is covered by a conductive material, e.g. copper etc., throughout an exterior surface thereof, thereby performing as an electrical contact point. The secondary switch member 220 comprises a body 224 connected by a bolt etc. to the interior surface of the upper guard 10 and a contact member 222 is positioned in the bottom of the body 224. The contact member 222 has a semi-circular surface 223 so that the ring of the front end portion 213 of the protrusive member 212 may engage the semi-circular surface of the contact member. The exterior of the surface 223 is covered with a conductive material, thereby performing as an electrical contact point.

In the above structure, even through worker grips the main switch 6 of the arm member 8 as described in the first embodiment, the circular blade 5 can not be activated. And with the downward movement of the arm member 8, the bottom edge of the lower guard 210 contacts the upper surface of the workpiece 7, moving the lower guard 210 upward to a predetermined height "E". In this case, the height in which the lower guard 210 contacts the workpiece 7 but where the protrusive member 212 does not contact the contact member 222 is labeled "E". When the front end portion 213 of the protrusive member 212 contacts the semi-circular surface 223 of the contact member 222, motor (not shown) is electrically rotating the blade 5. Furthermore, as the arm member 8 continues to move downward, the lower guard 210 is rotated in a counterclockwise direction. That is, the upward movement of the protrusive member 212 is restricted by the contact member 222. However, the lower guard 210 now rotates against the contact member 222, i.e., the members 213, 222 form the pivot for the lower guard 210; Hence, the blade 5 continuously rotates while the front end portion 213 is in contact with the semi-circular surface 223.

After the predetermined cutting operation, the arm member 8 having the main switch 6 gripped is raised to a certain extent such that the cut workpiece is replaced with a new workpiece. The lower guard 210 is moved downward or rotated in a clockwise direction, and the protrusive member 212 also is rotated in a clockwise direction. The front end portion 213 of the protrusive member 212 separately moves from the semi-circular surface 223 breaking the electrical contact. Therefore, the lower guard 210 returns to the former position, the power for the motor rotating the blade 5 is broken and the blade 5 cannot rotate.

What is claimed is:

1. A cutting instrument comprising a power-driven blade; and a movable blade carrier for moving said blade along an advancement stroke in order to approach and cut through a workpiece; said blade carrier comprising a first portion having a first guard disposed around said blade, and a second portion having a second guard for said blade; said second portion being mounted for movement relative to said first portion during said advancement stroke; and an electrical safety switch means having a safety position for preventing said blade from rotating at its cutting speed, and an operating position permitting said blade to rotate at its cutting speed; said safety switch means being normally disposed in its safety position when said blade is out of contact with a workpiece during said advancement stroke, said safety switch means arranged to be moved to its operating position in response to movement of said second portion relative to said first portion during said advancement stroke, said safety switch means including first and second switch parts connected to said first and second portions, respectively, said second switch part being fixedly joined to said second portion for movement therewith relative to said first switch part in a first direction into said operating position and in a second direction into said safety position, wherein said second switch part moves along a travel path relative to said first switch part and makes electrical contact with said first switch part during only a portion of said travel path.

2. A cutting instrument according to claim 1, wherein said first portion includes a manually grippable handle and a main operating switch.

3. A cutting instrument according to claim 1, wherein said second portion is pivotably mounted to said first portion for rotation about an axis, said travel path being arcuate about said axis.

4. A cutting instrument according to claim 1, wherein said travel path includes an initial portion in which said second switch part moves into electrical contact with an arcuate surface of said first switch part, said arcuate surface thereafter forming a pivot for said second portion to enable said second portion to pivot relative to said first portion during a cutting operation.

5. A cutting instrument according to claim 4, wherein said second portion is disposed below said first portion, said initial portion of said travel path being in a substantially vertical direction.

6. A cutting instrument according to claim 1, wherein said second portion is positioned so as to be returned to said safety position by gravitational force during a return stroke following said advancement stroke.

* * * * *